US012799874B1

United States Patent

(12) United States Patent
Black

(10) Patent No.: US 12,799,874 B1
(45) Date of Patent: Nov. 17, 2026

(54) AIR-TO-OIL LABYRINTH AND LIP SEALS FOR GAS TURBINE ENGINE SHAFTS

(71) Applicant: Rolls-Royce Corporation, Indianapolis, IN (US)

(72) Inventor: Joseph D. Black, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 19/294,011

(22) Filed: Aug. 7, 2025

(51) Int. Cl.
*F01D 11/02* (2006.01)

(52) U.S. Cl.
CPC .......... *F01D 11/02* (2013.01); *F05D 2220/32* (2013.01); *F05D 2240/55* (2013.01)

(58) Field of Classification Search
CPC .. F01D 11/02; F05D 2220/32; F05D 2240/55; F16J 15/447; F16J 15/4472; F16J 15/4474; F16J 15/4476; F16J 15/4478; F16J 15/32; F16J 15/3204
See application file for complete search history.

(56) References Cited

U.S. PATENT DOCUMENTS 2,861,421 A 11/1958 Hockert et al.
2,948,555 A 8/1960 Wright
3,122,374 A 2/1964 McGahan
3,606,349 A * 9/1971 Petrie et al. .......... F01D 11/025 415/113
4,088,329 A 5/1978 Junker
4,995,620 A 2/1991 Zawaski
5,201,835 A 4/1993 Hosie
5,211,535 A 5/1993 Martin et al.
5,498,007 A 3/1996 Kulkarni et al.
5,527,045 A 6/1996 Pondelick et al.
5,813,830 A 9/1998 Smith et al.
6,131,914 A 10/2000 Proveaux
6,921,079 B2 7/2005 Rensch
6,996,968 B2 2/2006 Peters et al.
7,175,388 B2 2/2007 Labb et al.
8,444,153 B2 5/2013 Gaebler
8,992,090 B1 3/2015 Mills
9,777,595 B2 10/2017 Sheridan et al.
9,915,175 B2 3/2018 Miller et al.
10,247,036 B2 4/2019 Do et al.
10,527,098 B1 1/2020 Lighty et al.
(Continued)

FOREIGN PATENT DOCUMENTS

EP 3680518 7/2020

*Primary Examiner* — Gilbert Y Lee
(74) *Attorney, Agent, or Firm* — Barnes & Thornburg

(57) ABSTRACT

A gas turbine engine includes a housing assembly arranged circumferentially around an axis, a shaft extending axially along the axis, and a seal assembly configured to block fluid communication between the housing assembly and the shaft. The housing assembly includes a first band, a second band spaced axially apart from the first band, a radial flange located axially between the first band and the second band, and an abradable layer coupled with a radially inner face of the second band. The seal assembly includes a lip seal coupled with the housing assembly that extends to and engages the shaft to block primarily oil on a first axial side of the radial flange. The seal assembly includes a labyrinth seal that extends away from the shaft into the abradable layer of the housing assembly to block primarily air on a second axial side of the radial flange.

18 Claims, 4 Drawing Sheets

(56) References Cited

U.S. PATENT DOCUMENTS

| | | | |
|---|---|---|---|
| 10,598,035 B2 | 3/2020 | Snow | |
| 10,927,960 B2 | 2/2021 | Bernacchi et al. | |
| 10,935,142 B2 | 3/2021 | Bernacchi et al. | |
| 11,193,590 B2 | 12/2021 | Black | |
| 11,199,103 B2 | 12/2021 | Wolfer | |
| 11,209,086 B2 | 12/2021 | David | |
| 11,236,636 B2 | 2/2022 | Amador et al. | |
| 11,255,272 B2 | 2/2022 | James | |
| 11,286,990 B2 | 3/2022 | Davis et al. | |
| 11,401,833 B2 | 8/2022 | Davis et al. | |
| 11,466,584 B1 | 10/2022 | Black | |
| 11,549,443 B2 | 1/2023 | Baker-Ostiguy et al. | |
| 11,933,180 B2 | 3/2024 | Macfarlane et al. | |
| 12,000,299 B1 | 6/2024 | Copeland | |
| 2004/0179935 A1 | 9/2004 | Maguire | |
| 2015/0014937 A1 | 1/2015 | Behrman | |
| 2017/0234222 A1 | 8/2017 | Schwendenmann | |
| 2018/0291814 A1* | 10/2018 | Anglin .................. | F16J 15/445 |
| 2018/0291815 A1 | 10/2018 | Munson et al. | |
| 2018/0291960 A1 | 10/2018 | Anglin et al. | |
| 2019/0211700 A1 | 7/2019 | Munson | |

* cited by examiner

AIR-TO-OIL LABYRINTH AND LIP SEALS FOR GAS TURBINE ENGINE SHAFTS

FIELD OF THE DISCLOSURE

The present disclosure relates generally to gas turbine engines and more specifically to seal assemblies adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include a rotor assembly coupling the turbine with the compressor and/or to a fan, propeller, etc. Lubricating fluids such as oil may be applied to the rotor bearings to prevent wear and reduce wear. As a result, the lubricating fluids may travel towards other areas of the gas turbine engine. In some examples, gas turbine engines may use seals to prevent lubricating fluids from reaching other components within the gas turbine engine. The seals may also be used to isolate cavities of different pressure regions in the gas turbine engines. In some examples, a seal may be used to seal a lubrication sump and/or a bearing chamber from higher temperature and pressure airflows elsewhere in the engine.

SUMMARY

The present disclosure may comprise one or more of the following features and combinations thereof.

A gas turbine engine may comprise a housing assembly, a shaft, and a seal assembly. The housing assembly may be arranged circumferentially around an axis. The housing assembly may include a first band and a second band spaced axially apart from the first band. The housing assembly may include a radial flange located axially between the first band and the second band. The radial flange may extend radially inward away from the first band towards the axis. The housing assembly may include an abradable layer coupled with a radially inner face of the second band.

In some embodiments, the shaft may extend axially along the axis and may be configured to rotate about the axis relative to the housing assembly. The shaft may include a first segment that extends circumferentially about the axis to provide a seal land. The shaft may include a second segment spaced axially apart from the first segment.

In some embodiments, the seal assembly may be configured to block fluid communication between the housing assembly and the shaft. The seal assembly may include a labyrinth seal. The labyrinth seal may extend radially outward away from the second segment of the shaft into the abradable layer of the housing assembly. The seal assembly may include a lip seal coupled with the radial flange of the housing assembly. The lip seal may extend radially inward to engage the seal land of the shaft. The lip seal may be arranged to block primarily oil on a first axial side of the radial flange. The labyrinth seal may be arranged to block primarily air on a second axial side of the radial flange. The lip seal may be configured to deflect during use of the gas turbine engine to reduce heat generated due to contact between the lip seal and the seal land.

In some embodiments, the housing assembly may further include an axial flange extending axially away from the radial flange. The axial flange may be spaced radially apart from the first band. The housing assembly may be shaped to define a housing cooling cavity configured to collect the oil. The housing cooling cavity may extend radially between the first band and the axial flange. The housing cooling cavity may be disposed on the first axial side of the radial flange. The housing cooling cavity may be axially aligned with and in thermal communication with the seal assembly to lower a temperature of the seal assembly during operation of the gas turbine engine.

In some embodiments, the seal assembly may further comprise a fastener. The fastener may include an annular collar that mechanically couples the lip seal to the axial flange of the housing assembly. The annular collar may be swaged with the axial flange to fix the seal assembly to the housing assembly radially inward of the axial flange. The seal assembly may further comprise a washer arranged around the axis. The washer may be disposed axially between the lip seal and a portion of the annular collar to securely couple the lip seal within the annular collar.

In some embodiments, the seal assembly further comprises a spring arranged around the axis. The spring may be disposed radially between the lip seal and the axial flange. The spring may be configured to bias the lip seal into engagement with the seal land.

In some embodiments, the first segment of the shaft may comprise an outer portion and an inner portion radially spaced apart from the outer portion. An outer surface of the outer portion may form the seal land. The first segment may be shaped to define a shaft cooling cavity between the inner portion and the outer portion axially aligned with the seal assembly. The first segment of the shaft may comprise a radial wall extending between the outer portion and the inner portion to define the shaft cooling cavity between the inner portion and the outer portion configured to collect the oil. The shaft cooling cavity may be axially aligned with and in thermal communication with the seal land to lower a temperature of the outer portion and the seal land during operation of the gas turbine engine. In illustrative embodiments, the labyrinth seal may comprise one or more protrusions extending away from the second segment of the shaft to engage with the abradable layer on the second band of the housing assembly.

According to another aspect of the present disclosure, a gas turbine engine may comprises a housing assembly, a shaft, and a seal assembly. The housing assembly may be arranged circumferentially around an axis. The housing assembly may include a first band and a second band spaced axially apart from the first band. The housing assembly may include a radial flange located axially between the first band and the second band. The radial flange may extend radially inward away from the first band towards the axis. The housing assembly may include an abradable layer that may be coupled with a radially inner face of the second band.

The shaft may extend axially along the axis. The shaft may be configured to rotate about the axis relative to the housing assembly. The shaft may include a first segment that extends circumferentially about the axis. The first segment may provide a seal land and a second segment spaced axially apart from the first segment.

The seal assembly may include a labyrinth seal. The labyrinth seal may extend radially outward away from the second segment of the shaft into the abradable layer of the housing assembly. The seal assembly may include a lip seal coupled with the radial flange of the housing assembly. The lip seal may extend radially inward toward the seal land of the shaft.

In some embodiments, the housing assembly may include an axial flange extending axially away from the radial flange. The axial flange may be spaced radially apart from the first band. The housing assembly may be shaped to define a housing cooling cavity configured to collect oil. The housing cooling cavity may extend radially between the first band and the axial flange. The housing cooling cavity may be disposed on a first axial side of the radial flange. The housing cooling cavity may be axially aligned with and in thermal communication with the seal assembly to lower a temperature of the seal assembly during operation of the gas turbine engine.

In some embodiments, the seal assembly may comprise a fastener. The fastener may include an annular collar that mechanically couples the lip seal to the axial flange of the housing assembly. The annular collar may be swaged with the axial flange to fix the seal assembly to the housing assembly radially inward of the axial flange. In some embodiments, the seal assembly may comprise a spring arranged around the axis. The spring may be disposed radially between the lip seal and the axial flange. The spring may be configured to bias the lip seal into engagement with the seal land.

In some embodiments, the first segment of the shaft may comprise an outer portion and an inner portion radially spaced apart from the outer portion. An outer surface of the outer portion may form the seal land. The first segment may be shaped to define a shaft cooling cavity between the inner portion and the outer portion axially aligned with the seal assembly. In some embodiments, the labyrinth seal may comprise one or more protrusions extending away from the second segment of the shaft to engage with the abradable layer on the second band of the housing assembly.

According to another aspect of the present disclosure, a method of blocking fluid communication between a housing assembly and a shaft of a gas turbine engine may comprise arranging the housing assembly circumferentially around an axis. The housing assembly may include a first band, a second band spaced axially apart from the first band, a radial flange located axially between the first band and the second band and extends radially inward away from the first band towards the axis, and an abradable layer coupled with a radially inner face of the second band.

In some embodiments, the method may comprise rotating the shaft about the axis. The shaft may include a first segment that extends circumferentially about the axis to provide a seal land and a second segment spaced axially apart from the first segment. In some embodiments, the method may comprise engaging a seal assembly configured to block fluid communication between the housing assembly and the shaft. The seal assembly may include a labyrinth seal that extends radially outward away from the second segment of the shaft into the abradable layer of the housing assembly. The seal assembly may include a lip seal coupled with the radial flange of the housing assembly and that extends radially inward to engage the seal land of the shaft. In some embodiments, the method may comprise blocking primarily oil on a first axial side of the radial flange with the lip seal. The method may comprise blocking primarily air on a second axial side of the radial flange with the labyrinth seal.

These and other features of the present disclosure will become more apparent from the following description of the illustrative embodiments.

DETAILED DESCRIPTION OF THE DRAWINGS

Figure 1:
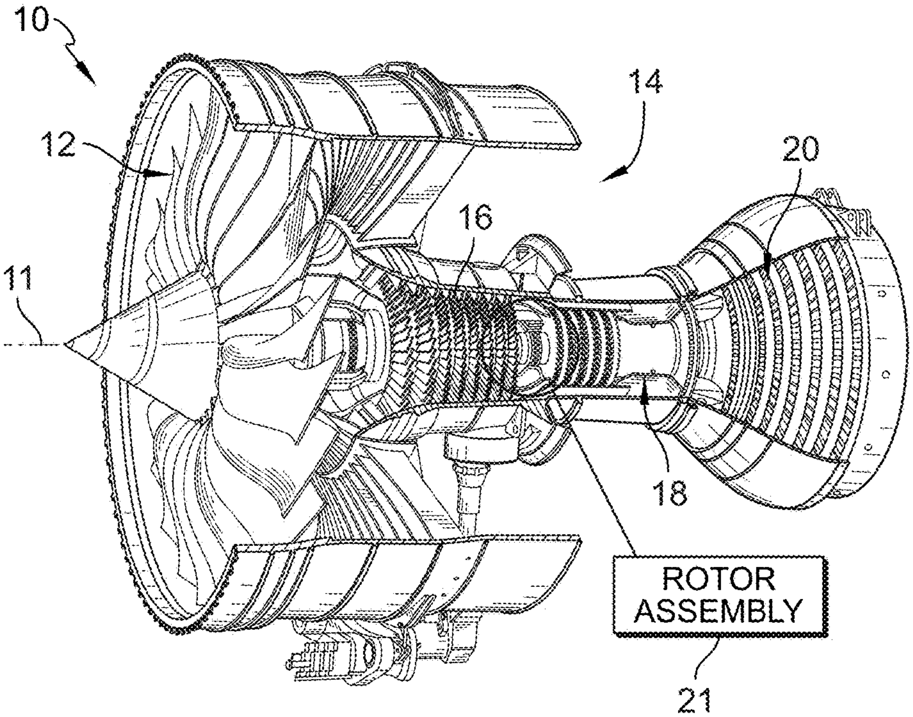
FIG. 1 is a cutaway view of a gas turbine engine that includes an engine core having a compressor, a combustor downstream of the compressor, and a turbine downstream of the combustor, a fan coupled with the engine core and configured to be driven to provide thrust for an aircraft, and further including a seal assembly in accordance with the present disclosure configured to separate a flow of oil and a flow of air withing the gas turbine engine.
Figure 2:
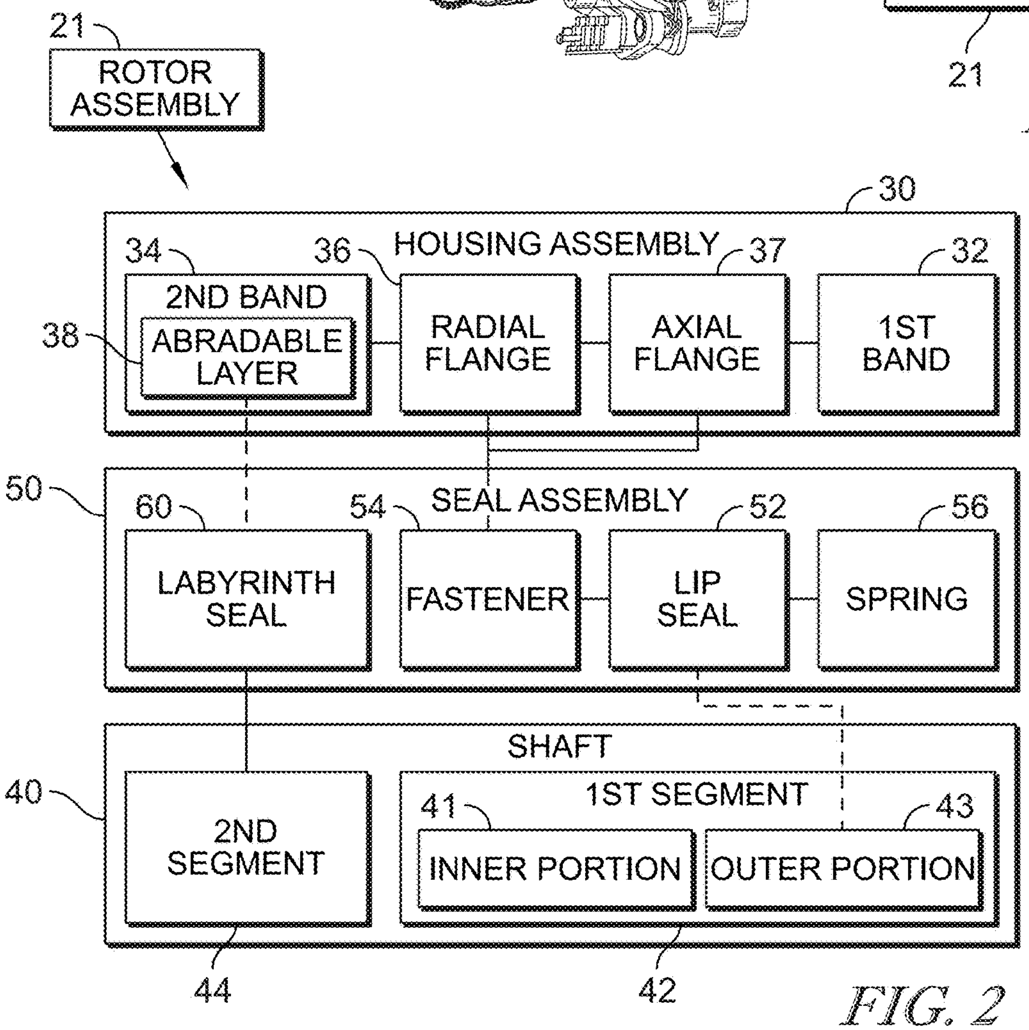
FIG. 2 is a schematic diagram of the seal assembly of the gas turbine engine of FIG. 1 configured to engage with a housing assembly and a shaft, showing the seal assembly includes a lip seal configured to extend from the housing assembly to engage the shaft to primarily seal the flow of oil from the flow of air and a labyrinth seal extending from the shaft to engage the housing assembly to primarily seal the flow of air from the flow of oil.

For the purposes of promoting an understanding of the principles of the disclosure, reference will now be made to a number of illustrative embodiments illustrated in the drawings and specific language will be used to describe the same.

An illustrative gas turbine engine 10 includes a fan 12 and an engine core 14 having a compressor 16, a combustor 18 located downstream of the compressor 16, and a turbine 20 located downstream of the combustor 18 as shown in FIG. 1 The fan 12 is driven by the turbine 20 and provides thrust for propelling the gas turbine engine 10. The compressor 16 compresses and delivers pressurized air to the combustor 18. The combustor 18 mixes fuel with the compressed air received from the compressor 16 and ignites the fuel. The hot, high-pressure products of the combustion reaction in the combustor 18 are directed into the turbine 20 to cause the turbine 20 to rotate about a central axis 11 and drive the compressor 16 and the fan 12. In other embodiments, the fan 12 is omitted and the turbine 20 drives a shaft to provide rotational energy to a system.

The gas turbine engine 10 further includes a rotor assembly 21 arranged within the engine core 14 as shown in FIG. 1. The rotor assembly 21 includes a housing assembly 30, a shaft 40, and a seal assembly 50 in accordance with the present disclosure and adapted for use in the gas turbine engine 10, as shown in FIGS. 2-5B. The seal assembly 50 blocks fluid communication between the between the housing assembly 30 and the shaft 40. The rotor assembly 21 may be used in a variety of locations with the gas turbine engine 10 such as being coupled with the compressor 16 and turbine 20, or used in auxiliary units, gearboxes, lift fan systems, etc., and may also be used with rotor assemblies outside of the field of gas turbine engines. Though described as being included in a gas turbine engine for illustrative purposes, the rotor assembly 21 may be used in any clutch system. As an example, the rotor assembly 21 may be used in a clutch system having at least one shaft that is not rotating during an entirety of the operating time of the clutch system.

The housing assembly 30 is arranged circumferentially around the axis 11 and includes a first band 32, a second band 34 spaced axially apart from the first band, a radial flange 36 located axially between the first band and the second band 34, and an abradable layer 38 coupled with the second band 34. The first band 32 is arranged circumferentially around the axis 11 and extends axially along at least a portion of the housing assembly 30. The second band 34 is similarly arranged circumferentially around the axis 11 and extends axially along at least a portion of the housing assembly 30. The second band 34 is axially spaced apart from the first band 32 such that the first band 32 and the second 34 extend axially along different parts of the housing assembly 30 and each form at least a portion of a radially outer wall of the housing assembly 30 at different axial positions.

Figure 3:
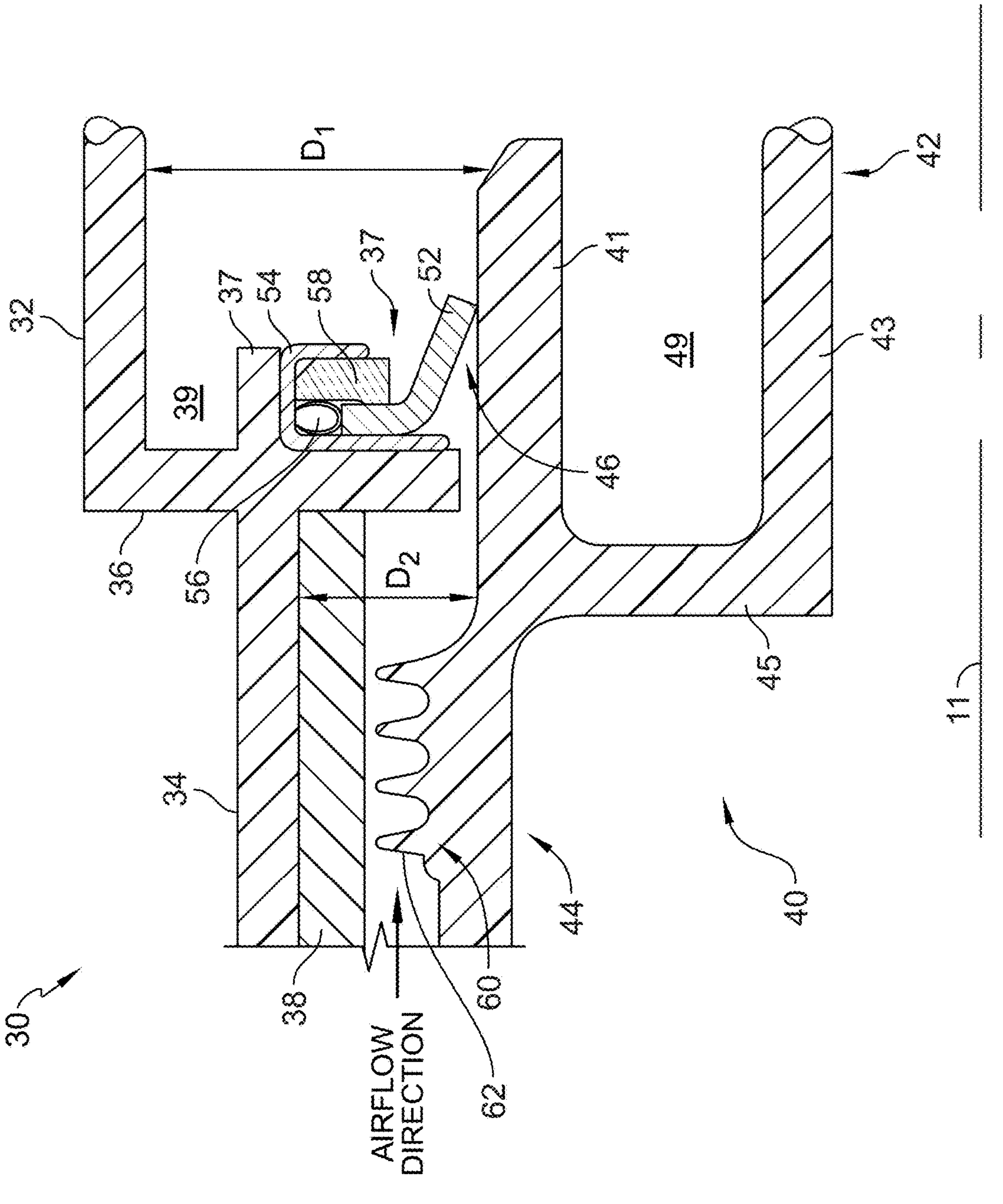
FIG. 3 is a section view of the seal assembly of the gas turbine engine of FIG. 1, showing that the gas turbine engine includes the housing assembly arranged circumferentially about an axis, the shaft extending axially along the axis and located radially inward of the housing, and the seal assembly disposed radially between the housing assembly and the shaft to block fluid communication between the housing assembly and the shaft.

In the illustrative embodiment, the first band 32 and the second band 34 are offset in the radial direction. As shown in FIG. 3, the first band 32 may be spaced radially apart from the shaft 40 a first distance D1 and the second band 34 may be spaced radially apart from the shaft 40 a second distance D2. The first distance D1 may be greater than the second distance D2 such that the first band 32 is spaced farther apart from the shaft 40 and the axis 11 in the radial direction than the second band 34.

The radial flange 36 is located axially between the first band 32 and the second band 34 and is coupled to a respective end of each of the first band 32 and the second band 34. The radial flange 36 may axially separate the first and second band 32, 34 such that the first band 32 is disposed on a first axial side of the radial flange 36 and the second band 34 is located and a second axial side of the radial flange 36. The radial flange 36 extends circumferentially around the axis 11. As shown in FIG. 3, the radial flange 36 extends radially inward from an end of the first band 32, away from the first band 32 and towards the axis 11. In some embodiments, radial flange 36 may extend substantially perpendicular to the first and second bands 32, 34, as shown in FIG. 3. In other embodiments, the radial flange 36 may be disposed at an angle to the first and second bands 32, 34. The radial flange 36 may extend radially inwards past the second band 34, such that a radially inner end of the radial flange 36 is disposed radially closer to the shaft 40 than the second band 34.

As shown in FIG. 3, the housing assembly 30 may include an axial flange 37. The axial flange 37 may be coupled to and extend axially away from the radial flange 36 on the first axial side of the radial flange 36. The axial flange 37 extends circumferentially around the axis 11, extending axially along at least a portion of the rotor assembly 21. The axial flange 37 may extend substantially perpendicular to the radial flange 36. As will be described in more detail below, the axial flange 37 and the radial flange 36 may cooperate to couple the seal assembly 50 to the housing assembly 30.

The axial flange 37 is disposed radially between the first band 32 and the shaft 40. In the illustrative embodiment, the axial flange 37 may at least partially aligned with the second band 34, such that the axial flange 37 and the second band 34 are disposed at approximately the same radial location along the radial flange 36. In other embodiments, the axial flange 37 and the second band 34 may be radially offset from each other. In some embodiments, the axial flange 37 may extend substantially parallel to the first band 32 and/or the shaft 40. The axial flange 37 may be spaced radially apart from the first band 32 to at least partially define a housing cooling cavity 39 disposed radially between the axial flange 37 and the first band 32.

The axial flange 37, the first band 32, and the radial flange 36 may cooperate to form the housing cooling cavity 39, as shown in FIG. 3. The axial flange 37 and the first band 32 may form the axial walls of the housing cooling cavity 39, such that the housing cooling cavity 39 extends radially between the first band 32 and the axial flange 37 on the first axial side of the radial flange 36. The radial flange 36 may form a radial wall of the housing cooling cavity 39, separating the hosing cooling cavity 39 from the second band 34. The axial flange 37, the first band 32, and the radial flange 36 may be arranged to collect oil within the housing cooling cavity 39. As shown in FIG. 3, the housing cooling cavity 39 may be axially aligned with the seal assembly 50. The housing cooling cavity 39 may be in thermal communication with the seal assembly 50 and arranged such that oil contained within the housing cooling cavity 39 cools and lowers a temperature of the seal assembly 50 during operation of the gas turbine engine 10.

The housing assembly 30 may include an abradable layer 38 coupled with a radially inner face of the second band 34. The abradable layer 38 may be designed to at least partially be worn down through engagement with the labyrinth seal 60. The abradable layer 38 may have, for example, a honeycomb structure. The abradable layer 38 may be disposed on the second axial side of the radial flange 36 and may extend axially along at least a portion of the second band 34. The abradable layer 38 may extend radially inwards from the second band 34 towards the shaft 40. As will be described in more detail below, the abradable layer 38 extends towards the shaft 40 to engage at least a portion of the seal assembly 50 disposed on the shaft 40 radially inwards of abradable layer 38.

The shaft 40 extends axially along the axis 11 and is configured to rotate about the axis 11 relative to the housing assembly 30. As shown in FIG. 3, the shaft includes a first segment 42 and a second segment 44 spaced axially apart from the first segment 42. The first segment 42 of the shaft 40 is arranged circumferentially around the axis 11 and extends axially along at least a portion of the shaft 40 to provide a seal land 46 for the seal assembly 50. The second segment 44 is similarly arranged circumferentially around the axis 11 and extends axially along at least a portion of the shaft 40.

The second segment 44 is axially spaced apart from the first segment 42 such that the first segment 42 and the second segment 44 extend axially along different parts of the shaft 40 and each form at least a portion of a radially outer wall of the shaft 40 at different axial positions. The first segment 42 is disposed radially inward of the first band 32 such that a radially outer surface of the first segment 42 is opposite a radially inner surface of the first band 32 and/or the axial flange 37. The second segment 44 is disposed radially inward of the second band 34 such that a radially outer surface of the second segment 44 is opposite a radially inner surface of the second band 34 and/or the abradable layer 38.

As shown in FIG. 3, the first segment 42 comprises an outer portion 41, an inner portion 43 radially spaced apart from the outer portion, and a radial wall 45 extending between the outer portion 41 and the inner portion 43. A radially outer surface of the outer portion 41 forms the seal land 46 that engages the seal assembly 50. The radial wall 45 is located axially between the second segment 44 and at least a portion of the first segment 42 and is coupled to a respective end of each of the first segment 42 and the second segment 44. The radial wall 45 may axially separate the first and second segments 42, 44 such that at least apportion of the first segment 42 is disposed on a first axial side of the radial wall 45 and the second segment 44 is located on the second axial side of the radial wall 45.

The radial wall 45 extends circumferentially around the axis 11. As shown in FIG. 3, the radial wall 45 extends radially inward from an end of the outer portion 41 of the first segment 42, away from the outer portion 41, and towards the inner portion 43 and the axis 11. In some embodiments, the radial wall 45 may extend substantially perpendicular to the outer and inner portions 41, 43, as shown in FIG. 3. In other embodiments, the radial wall 45 may be disposed at an angle to the outer and inner portion 41, 43.

The inner portion 43 is coupled to and extends away from the radial wall 45 in an axial direction. The inner portion 43 extends circumferentially around the axis 11, extending axially along at least a portion of the shaft 40. The inner portion 43 may extend substantially perpendicular to the radial wall 45. The inner portion 43 may be disposed radially between the outer portion 41 and the axis 11. In some embodiments, the inner portion 43 may extend substantially parallel to the outer portion 41. The inner portion 43 may be spaced radially apart from the outer portion 41 to at least partially define a shaft cooling cavity 49 disposed radially between the inner portion 43 and the outer portion 41.

The inner portion 43, the outer portion 41, and the radial wall 45 cooperate to form the shaft cooling cavity 49, as shown in FIG. 3. The inner portion 43 and the outer portion 41 may form the axial walls of the shaft cooling cavity 49, such that the shaft cooling cavity 49 extends radially between the inner portion 43 and the outer portion 41 on the first axial side of the radial wall 45. The radial wall 45 may form a radial wall of the shaft cooling cavity 49, separating the shaft cooling cavity 49 from the second segment 44. The inner portion 43, the outer portion 41, and the radial wall 45 may be arranged to collect oil within the shaft cooling cavity 49. As shown in FIG. 3, the shaft cooling cavity 49 may be axially aligned with the seal assembly 50. The shaft cooling cavity 49 may be in thermal communication with the seal assembly 50 and arranged such that oil contained within the shaft cooling cavity 49 cools and lowers a temperature of the seal assembly 50 during operation of the gas turbine engine 10.

The second segment 44 extends axially away from one end of the outer portion 41 and/or a radially outer end of the radial wall 45. The second segment 44 may be substantially aligned with at least a portion the first segment 42, such that the second segment 44 is disposed at approximately the same radial distance from the axis 11 as the outer portion 41 of the first segment 42. Alternatively, the second segment 44 may be radially offset from the outer portion 41 of the first segment 42.

Figure 4:
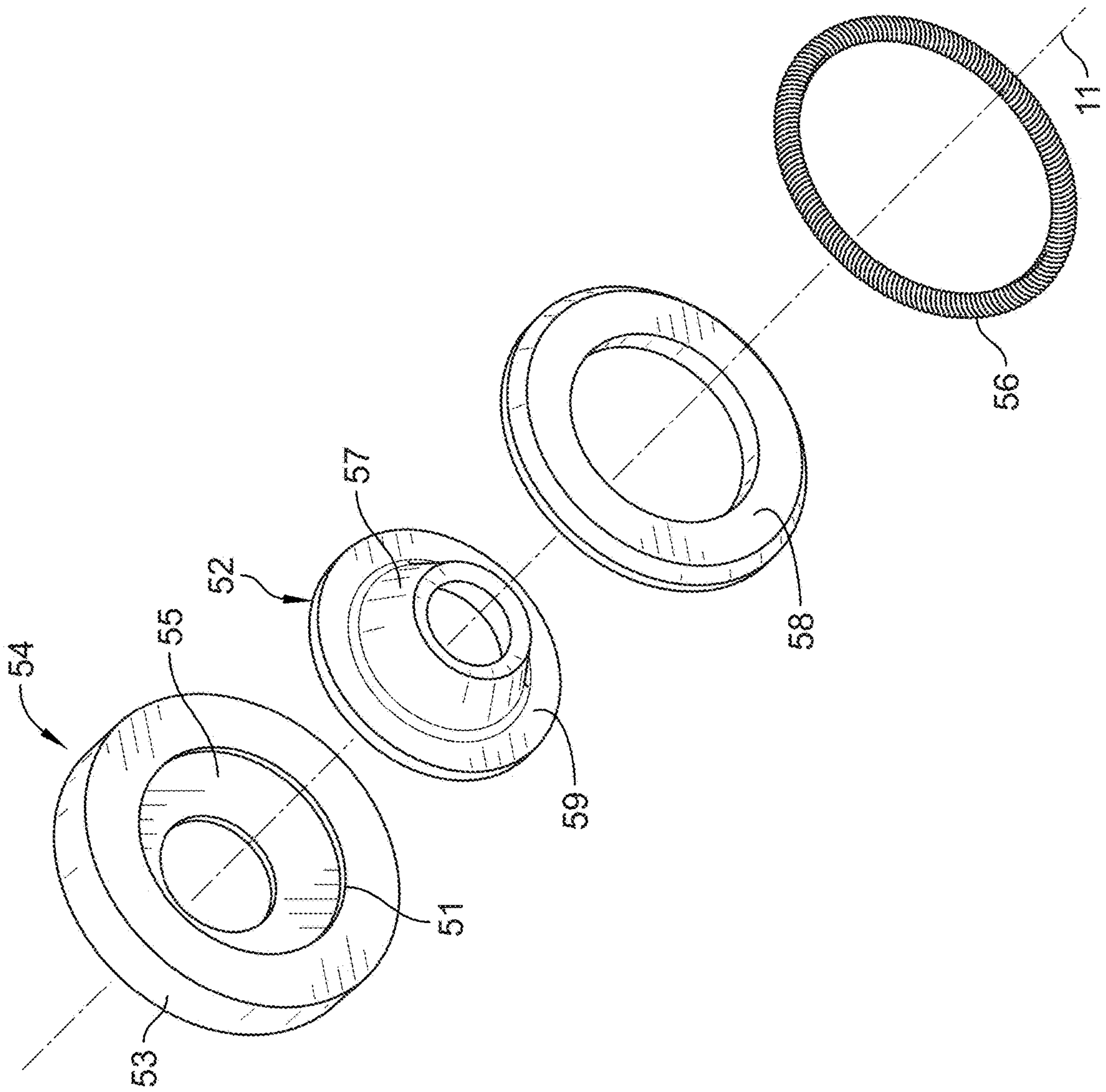
FIG. 4 is an exploded view of the seal assembly of FIG. 3, showing the seal assembly includes an annular fastener, an annular lip seal that fits within the fastener, an annular washer that fits between a wall of the fastener and the lip seal to secure the lip seal within the fastener, and an annular spring that fits within a channel formed by the fastener and is disposed radially between the lip seal and the fastener to bias the lip seal to engage with a seal land on the shaft.

The seal assembly 50 extends radially between at least a portion of the shaft 40 and at least a portion of the housing assembly 30 to block fluid communication between the housing assembly 30 and the shaft 40. As shown in FIGS. 3 and 4, the seal assembly may comprise a labyrinth seal 60, a lip seal 52, a fastener 54, and a spring 56. The lip seal 52 is coupled to the housing assembly 30 and may extend radially be between the outer portion 41 of the shaft 40 and the axial flange 37 of the housing assembly 30 to block primarily oil on the first axial side of the radial flange 36. The labyrinth seal 60 is coupled to the shaft 40 and extends radially between the second segment 44 of the shaft 40 and the abradable layer 38 of the housing assembly 30 to block primarily air on the second axial side of the radial flange 36.

The lip seal 52 is coupled to the housing assembly 30 via the fastener 54. The fastener 54 is annular and extends circumferentially around the axis 11. As shown in FIG. 3, the fastener 54 may be coupled to the housing assembly 30 such that the fastener 54 is disposed on the first axial side of the radial flange 36 and radially inward of the axial flange 37. As shown in FIGS. 3 and 4, the fastener 54 may comprise an annular collar formed by a first radial wall 51, a second radial wall 55 spaced axially from the first radial wall 51, and an axial wall 53 extending between the first and second radial walls 51, 55 at a radially outer end of the fastener 54. When coupled to the housing assembly 30, the first radial wall 51 may abut and sit flush against a portion of the radial flange 36 and the axial wall 53 may abut and sit flush against a portion of the axial flange 37. The fastener 54 may be mechanically coupled to the housing assembly 30, as indicated by the solid line extending between the fastener 54 and the radial and axial flanges 36, 37 in FIG. 2. For example, the fastener 54 may be swaged to the housing assembly 30 to sit radially within the axial flange 37 and be fixed relative to the housing assembly 30.

The lip seal 52 is annular and extends circumferentially around the axis 11. The lip seal 52 may be mechanically coupled to the housing assembly 30 by the fastener 54. As shown in FIG. 3, the lip seal 52 may be disposed axially between the two radial walls 51, 55 of the fastener 54 and extend radially between the axial wall 53 of the fastener 54 and the outer portion 41 of the first segment 42 of the shaft 40 to engage the shaft 40. The lip seal 52 may comprise a material with a maximum temperature rating of at least 315 degrees Celsius to withstand the heat experienced by the lip seal 52 during operating of the gas turbine engine 10. For example, the lip seal 52 may comprise a polymer material, such as TEFLON, or any other suitable material. The lip seal 52 may comprise an attachment portion 57 and seal portion 59.

The attachment portion 57 may extend in the radial direction and be located between the two radial walls 51, 55 of the fastener 54. The attachment portion 57 may be securely held in place by the two radial walls 51, 55, mechanically coupling the lip seal 52 to the housing assembly 30. As shown in FIG. 3, an annular washer 58 or gasket may extend circumferentially around the axis 11 and be placed in the fastener 54 between the radial walls 51, 55. The washer 58 may fill the space between the radial walls 51, 55 and help snugly hold the lip seal 52 in place. The second radial wall 55 of the fastener 54 may be deformed and/or bent towards the first radial wall 51 once the spring 56, washer 58, and lip seal 52 are placed within the fastener 54 to squeeze the lip seal 52 and the washer 58 between the two radial walls 51, 55 and hold them in place.

Figure 5B:
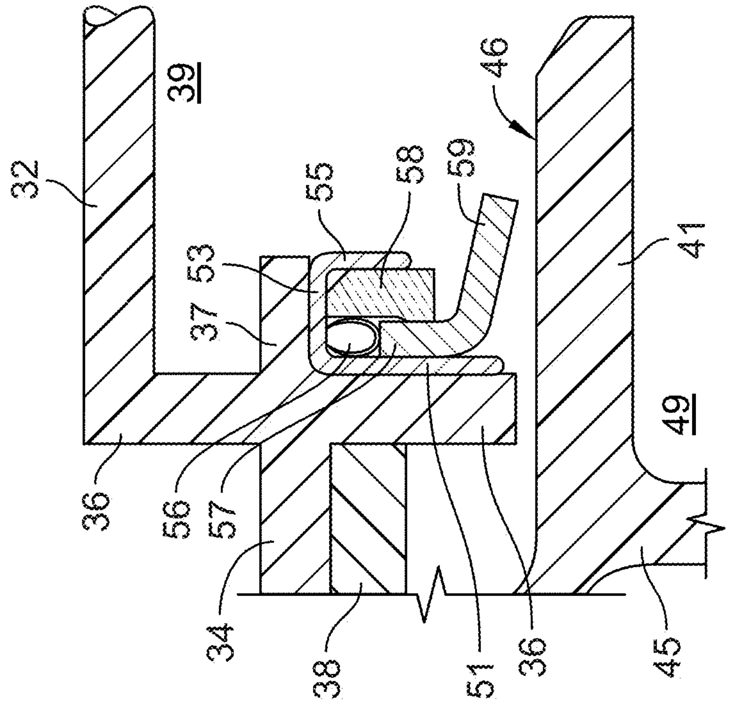
FIG. 5B is a section view of a portion of the seal assembly of FIG. 3 showing the lip seal deflected away from the shaft by pressure from the flow of air such that the lip seal does not contact the seal land to reduce heat generated by contact between the lip seal and the seal land during some operating conditions of the rotor assembly.
Figure 5A:
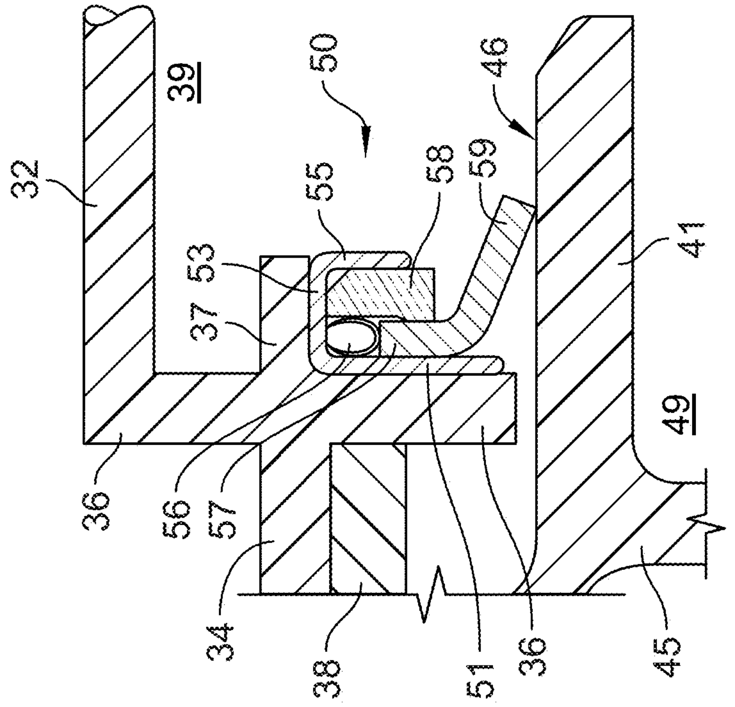
FIG. 5A is a section view of a portion of the seal assembly of FIG. 3 showing the lip seal engaged and in contact with the seal land of the shaft during some operating conditions of the rotor assembly.

The seal portion 59 may extend at an angle relative to the attachment portion 57 and extend in both the radial and axial directions. In the illustrative embodiment, the seal portion 59 extends axially away from the attachment portion 57 and the radial flange 36. The seal portion 59 also extends radially away from the attachment portion 57 and towards the outer portion 41 of the first segment 42 of the shaft 40. In other embodiments, the seal portion 59 may be arranged in other configurations. As indicated by the dashed line between the lip seal 52 and the outer portion 43 in FIG. 2, the seal portion 59 contacts the seal land 46 on the radially outer wall of the outer portion 41 of the shaft 40, forming a fluid tight seal between the housing assembly 30 and the shaft 40. This is further shown in FIGS. 3 and 5A. During operation of the gas turbine engine 10, air pressure imposed on the lip seal 52 from the second axial side may slightly deflect and/or lift the seal portion 59 off the seal land 46, as shown in FIG. 5B. This gap form between the seal portion 59 and the seal land 46 helps mitigate heat generated by contact between the lip seal 52 and the shaft 40, helping increase the life of the lip seal 52.

The spring 56 may be annular and extend circumferentially around the axis 11. For example, the spring 56 may be an annular spring, a coil spring, or any other type of biasing element suitable for biasing the lip seal 52 radially inwards. The spring 56 is disposed radially between a portion of the fastener 54 and the lip seal 52. As shown in FIG. 3, the spring 56 may be disposed axially between the radial walls 51, 55 of the fastener 54 and radially inward of the axial wall 53. The spring 56 is disposed radially outward of the attachment portion 57 of the lip seal 52 and acts to push or bias the lip seal 52 radially inwards towards the axis 11 to contact and engage the seal land 46 on the shaft 40.

The labyrinth seal 60 may be separate from the fastener 54 and lip seal 52. As shown in FIG. 3 and indicated by the solid line between the labyrinth seal 60 and the second segment 44 in FIG. 2, the labyrinth seal 60 is coupled to a radially outer surface of the second segment 44 of the shaft 40 and is disposed on the second axial side of the radial flange 36. The labyrinth seal 60 may extend circumferentially around the axis 11. The labyrinth seal 60 extends radially outward from the second segment 44 of the shaft 40, away from the shaft 40 and towards the second band 34 of the housing assembly 30.

The labyrinth seal 60 may comprises a plurality of protrusions 62, which may also be referred to as knives, that are axially spaced apart from each other along the length of the labyrinth seal 60. The protrusions 62 extend circumferentially around the axis 11. The protrusions 62 of the labyrinth seal 60 extend into and engage the abradable layer 38 on the radially inner surface of the second band 34, as indicated by the dashed line between the labyrinth seal 60 and the abradable layer 38 in FIG. 2. The protrusions 62 may wear into the abradable layer 38 due to friction generated between a radially outer diameter of the protrusion 62 that contacts the abradable layer 38 during rotation of the shaft 40 about the axis 11.

A method of using the seal assembly 50 is described below. The method includes blocking fluid communication between the housing assembly 30 and the shaft 40 of the gas turbine engine 10. The method includes arranging the housing assembly 30 circumferentially around the axis 11 and the shaft 40 extending along the axis 11. The method includes rotating the shaft 40 about the axis 11. The method includes engaging the seal assembly 50 and blocking fluid communication between the housing assembly 30 and the shaft 40 with the seal assembly 50. The method includes blocking primarily oil on the first axial side of the radial flange 36 with the lip seal 52. The method includes blocking primarily air on the second axial side of the radial flange 36 with the labyrinth seal 60.

In some embodiments, the seal assembly 50 may be used to seal a bearing chamber disposed on the first axial side of the radial flange 36. Bearing chamber oil sealing may present a significant challenge on gas turbine engine. Oil leaks may cause high oil consumption, potential internal fires, and oil smell in a cabin of an aircraft powered by the gas turbine engine due to oil entering the bleed air system. Advantageously, the labyrinth seal 60 in the seal assembly 50 of FIGS. 2 and 3, may prevent oil leakage while having a relatively long life and low cost relative to other sealing options. This advantage may be a result of the labyrinth seal 60 rubbing into a fixed clearance provided by the abradable layer 38 that may not change over time.

However, some labyrinth seals, when used alone in sealing systems, may have a disadvantage of using relatively high amounts of airflow. The high airflow disadvantage may be caused by limitations on the minimum seal clearance between the knifes of the labyrinth seal and the structures they engage with due to differential thermal deflections. Rotor imbalance and centrifugal deflections may cause the labyrinth seal knifes to rub in larger clearances than desired into the structure they engage. The resulting relatively high air usage may negatively impact specific fuel consumption, or fuel economy, of the gas turbine engine. Some labyrinth seals may also require venting the air, also referred to as buffer air, overboard the aircraft after it enters the bearing chamber. Oil may have to be separated from the air through an air-oil separator, but separation inefficiencies may result in excess oil consumption due to oil lost in the overboard air.

Circumferential carbon seals and carbon face seals may be used in some sealing arrangements but are relatively expensive compared to lower cost labyrinth seals. These seals may have the advantage of relatively low air flows due to reduced seal clearances. However, the carbon in the seals may wear over time which can lead to higher air flows, oil leakage, and engine removal. Additionally, circumferential seals may have leakage paths in seal segments that are prone to leak if the delta pressure is less than 1-2 psi across the seal.

The seal assembly 50 and sealing method described above, which uses a combination of the labyrinth seal 60 and the lip seal 52, overcomes these disadvantages. The lip seal 52 blocks oil from challenging the labyrinth seal 60. In some embodiments, the lip seal 52 comprises a high temperature Teflon material that is able to operate successfully at high surface speeds and can tolerate temperatures in the 600 degrees Fahrenheit range, or approximately 315 Celsius. The seal assembly 50 uses the labyrinth seal 60 in combination with the lip seal 52 to take advantage of the relatively low cost of the labyrinth seal 60. Additionally, the usage of the lip seal 52 adds the advantage of relatively lower airflows as compared to the lip seal 52 alone.

The labyrinth seal 60 may also advantageously reduce air pressures and temperatures imposed on the lip seal 52, while still allowing enough air pressure to be imposed on the lip seal 52 to slightly deflect and/or lift the lip seal 52 off the seal land 46. In some embodiments, the lip seal 52 may include lift off features. For example, in some embodiments, the lip seal 52 may be formed and/or molded with lift off features in the inner diameter of the lip seal rub 52 facing the seal land 46 that help the lip seal 52 lift off the seal land 46. The gap created by the deflected lip seal 52 may reduce the heat generated at the lip seal 52 and increase the seal assembly 50 life. This clearance between the lip seal 52 and the seal land 46, however, may be smaller than the clearances of the labyrinth seal 60 based on the interference of an inner diameter of the lip seal 52 with the seal land 46. This provides relatively lower airflows, increased specific fuel consumption (SFC), and a reduced leak path for the oil. The lip seal 52 may also provide adequate air velocities at the inner diameter of the lip seal 52 to push any oil challenging the seal 52 back into the bearing chamber.

The labyrinth seal 60 may also provide redundancy in the event of lip seal 52 wear. In such an scenario, the labyrinth seal 60 may still block oil leakage and mitigate the risk of engine removals. Another potential advantage of the seal assembly 50 may be the ability to draw the buffer pressure from an earlier stage (lower pressure) in the compressor 16. This would also improve SFC and lower the air temperatures.

As described above, the shaft 40 may include the shaft cooling cavity 49 to provide cooling oil to first segment 42 of the shaft 40 to reduce the temperature at the inner diameter of the lip seal 52 to minimize wear. The housing assembly 30 may include the housing cooling cavity 39 to minimize a temperature at an outer diameter of the lip seal 52 and to the cool bearing chamber. Alternatively, the housing assembly 30 may only include one of the cooling cavities 39, 49 or may not include either cooling cavity 39, 49. In some embodiments where the housing assembly 30 does not include the housing cooling cavity 39, the fastener 54 and lip seal 52 may be coupled to the radial flange 36 and the first band 32, and the axial flange 37 may be omitted.

Additionally or alternatively, the number of labyrinth knifes 62 may vary. As shown in FIG. 3, the labyrinth seal 60 may, for example, comprise four knives 62. In other embodiments, the labyrinth seal 60 may comprise more knives 62, less knives 62, or only one knife 62. Additionally or alternatively, while a high temperature Teflon may be used for the lip seal 52 material in some embodiments, the lip seal 52 material may be any material with a relatively low coefficient of friction, low wear rates, and high temperature capability. For example, in some embodiments, the lip seal 52 may comprise an elastomeric material. Additionally, the seal assembly 50 may comprise multiple lip seals 52 axially spaced apart from each other.

Typically, lip seals have not been used for main shaft sealing applications due to the relatively high temperatures involved and/or experienced. The relatively high temperatures, coupled with the surface speeds involved, and the temperature and wear capability of the elastomeric materials used in lip seals, have typically prevented the use of lip seals in main shaft sealing applications. Advantageously, the system and methods described herein lower the temperatures at the lip-seal-to-mating-shaft interface by using buffer air to lift off the seal. The system and methods described herein also provide methods to reduce the temperature at the seal by utilizing design features that effect and improve the transfer of heat away from the seal. Furthermore, the lip seal as described herein maintains a relatively small and/or minimal clearance to limit airflow into the sump to improve specific fuel consumption (SFC), minimize vent overboard requirements, and reduce sump temperatures.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:

a housing assembly arranged circumferentially around an axis, the housing assembly including a first band, a second band spaced axially apart from the first band, a radial flange located axially between the first band and the second band and extends radially inward away from the first band towards the axis, and an abradable layer coupled with a radially inner face of the second band;

a shaft that extends axially along the axis and is configured to rotate about the axis relative to the housing assembly, the shaft including a first segment that extends circumferentially about the axis to provide a seal land and a second segment spaced axially apart from the first segment, the shaft spaced apart radially from a radially inner terminal end of the radial flange to form a space therebetween; and a seal assembly configured to block fluid communication between the housing assembly and the shaft, the seal assembly including a labyrinth seal that extends radially outward away from the second segment of the shaft into the abradable layer of the housing assembly and a lip seal coupled with the radial flange of the housing assembly and that extends radially inward to engage the seal land of the shaft, the lip seal arranged to block primarily oil on a first axial side of the radial flange and the labyrinth seal arranged to block primarily air on a second axial side of the radial flange, and the space between the radial flange and the shaft is in direct fluid communication with the labyrinth seal and the lip seal such that a pressure of the air on the second axial side of the radial flange acting through the space between the radial flange and the shaft causes the lip seal to deflect radially away from the shaft to form a clearance gap between the lip seal and the shaft during use of the gas turbine engine to reduce heat generated due to contact between the lip seal and the seal land.

2. The gas turbine engine of claim 1, wherein the housing assembly further includes an axial flange extending axially away from the radial flange, the axial flange spaced radially inward from the first band to locate the axial flange radially between the first band and the radially inner terminal end of the radial flange.

3. The gas turbine engine of claim 2, wherein the first band, the axial flange, and the radial flange of the housing assembly cooperate to define a housing cooling cavity configured to collect the oil, the housing cooling cavity extending radially between the first band and the axial flange and disposed on and fluidly opens axially into the first axial side of the radial flange, wherein the housing cooling cavity is axially aligned with and in thermal communication with the seal assembly to lower a temperature of the seal assembly during operation of the gas turbine engine.

4. The gas turbine engine of claim 2, wherein the seal assembly further comprises a fastener including an annular collar that mechanically couples the lip seal to the axial flange of the housing assembly, the annular collar swaged with the axial flange to fix the seal assembly to the housing assembly radially inward of the axial flange.

5. The gas turbine engine of claim 4, wherein the seal assembly further comprises a washer arranged around the axis and disposed axially between the lip seal and a portion of the annular collar to securely couple the lip seal within the annular collar.

6. The gas turbine engine of claim 2, wherein the seal assembly further comprises a spring arranged around the axis and disposed radially between the lip seal and the axial flange, the spring configured to bias the lip seal into engagement with the seal land.

7. The gas turbine engine of claim 1, wherein the first segment of the shaft comprises an outer portion and an inner portion radially spaced apart from the outer portion, an outer surface of the outer portion forming the seal land.

8. The gas turbine engine of claim 7, wherein the first segment is shaped to define a shaft cooling cavity between the inner portion and the outer portion axially aligned with the seal assembly.

9. The gas turbine engine of claim 8, wherein the first segment of the shaft comprises a radial wall extending between the outer portion and the inner portion to define the shaft cooling cavity between the inner portion and the outer portion configured to collect the oil, the shaft cooling cavity axially aligned with and in thermal communication with the seal land to lower a temperature of the outer portion and the seal land during operation of the gas turbine engine.

10. The gas turbine engine of claim 1, wherein the labyrinth seal comprises one or more protrusions extending away from the second segment of the shaft to engage with the abradable layer on the second band of the housing assembly.

11. A gas turbine engine comprising:
- a housing assembly arranged circumferentially around an axis, the housing assembly including a first band, a second band spaced axially apart from the first band, a radial flange located axially between the first band and the second band and extends radially inward away from the first band towards the axis, and an abradable layer coupled with a radially inner face of the second band;
- a shaft that extends axially along the axis and is configured to rotate about the axis relative to the housing assembly, the shaft including a first segment that extends circumferentially about the axis to provide a seal land and a second segment spaced axially apart from the first segment; and
- a seal assembly including a labyrinth seal that extends radially outward away from the second segment of the shaft into the abradable layer of the housing assembly and a lip seal coupled with the radial flange of the housing assembly and that extends radially inward toward the seal land of the shaft,
- wherein the housing assembly further includes an axial flange extending axially away from the radial flange, the axial flange spaced radially inward from the first band,
- wherein the first band, the axial flange, and the radial flange of the housing assembly cooperate to define a housing cooling cavity configured to collect oil, the housing cooling cavity extending radially between the first band and the axial flange and disposed on and fluidly opens axially into a first axial side of the radial flange, wherein the housing cooling cavity is axially aligned with and in thermal communication with the seal assembly to lower a temperature of the seal assembly during operation of the gas turbine engine.

12. The gas turbine engine of claim 11, wherein the seal assembly further comprises a fastener including an annular collar that mechanically couples the lip seal to the axial flange of the housing assembly, the annular collar swaged with the axial flange to fix the seal assembly to the housing assembly radially inward of the axial flange.

13. The gas turbine engine of claim 11, wherein the seal assembly further comprises a spring arranged around the axis and disposed radially between the lip seal and the axial flange, the spring configured to bias the lip seal into engagement with the seal land.

14. The gas turbine engine of claim 11, wherein the first segment of the shaft comprises an outer portion and an inner portion radially spaced apart from the outer portion, an outer surface of the outer portion forming the seal land.

15. The gas turbine engine of claim 14, wherein the first segment is shaped to define a shaft cooling cavity between the inner portion and the outer portion axially aligned with the seal assembly.

16. The gas turbine engine of claim 11, wherein the labyrinth seal comprises one or more protrusions extending away from the second segment of the shaft to engage with the abradable layer on the second band of the housing assembly.

17. A method of blocking fluid communication between a housing assembly and a shaft of a gas turbine engine, the method comprising:
- arranging the housing assembly circumferentially around an axis, the housing assembly including a first band, a second band spaced axially apart from the first band, a radial flange located axially between the first band and the second band and extends radially inward away from the first band towards the axis, and an abradable layer coupled with a radially inner face of the second band;
- rotating the shaft about the axis, the shaft including a first segment that extends circumferentially about the axis to provide a seal land and a second segment spaced axially apart from the first segment; and
- engaging a seal assembly configured to block fluid communication between the housing assembly and the shaft, the seal assembly including a labyrinth seal that extends radially outward away from the second segment of the shaft into the abradable layer of the housing assembly and a lip seal coupled with the radial flange of the housing assembly and that extends radially inward to engage the seal land of the shaft,
- wherein the housing assembly further includes an axial flange extending axially away from the radial flange, the axial flange spaced radially inward from the first band,
- wherein the first band, the axial flange, and the radial flange of the housing assembly cooperate to define a housing cooling cavity configured to collect oil, the housing cooling cavity extending radially between the first band and the axial flange and disposed on and fluidly opens axially into a first axial side of the radial flange, and the housing cooling cavity is axially aligned with and in thermal communication with the seal assembly.

18. The method of claim 17 further comprising
- blocking primarily oil on a first axial side of the radial flange with the lip seal, and
- blocking primarily air on a second axial side of the radial flange with the labyrinth seal.

* * * * *